(12) United States Patent
Schulte

(10) Patent No.: US 10,442,164 B2
(45) Date of Patent: Oct. 15, 2019

(54) FLOOR, WALL, OR CEILING PANEL AND METHOD FOR PRODUCING SAME

(71) Applicant: VÄLINGE INNOVATION AB, Viken (SE)

(72) Inventor: Guido Schulte, Rüthen-Meiste (DE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 15/039,638

(22) PCT Filed: Mar. 27, 2014

(86) PCT No.: PCT/DE2014/100106
§ 371 (c)(1),
(2) Date: May 26, 2016

(87) PCT Pub. No.: WO2015/078434
PCT Pub. Date: Jun. 4, 2015

(65) Prior Publication Data
US 2017/0120564 A1    May 4, 2017

(30) Foreign Application Priority Data
Nov. 27, 2013 (DE) .................. 10 2013 113 125

(51) Int. Cl.
*B32B 21/00* (2006.01)
*B32B 37/00* (2006.01)
(Continued)

(52) U.S. Cl.
CPC ............ *B32B 21/042* (2013.01); *B32B 21/13* (2013.01); *B32B 21/14* (2013.01); *B32B 37/10* (2013.01);
(Continued)

(58) Field of Classification Search
None
See application file for complete search history.

(56) References Cited

U.S. PATENT DOCUMENTS 2,018,712 A    10/1935    Elmendorf
2,419,614 A     4/1947    Welch
(Continued)

FOREIGN PATENT DOCUMENTS

AU          80284/75      6/1975
AU       2011236087 A1    5/2013
(Continued)

OTHER PUBLICATIONS

Machine translation of description of JPH03211047 (A), 6 pages, Sep. 1991. (Year: 1991).*
(Continued)

*Primary Examiner* — Linda L Gray
(74) *Attorney, Agent, or Firm* — Buchanan Ingersoll & Rooney P.C.

(57) ABSTRACT

A floor, wall, or ceiling panel has a base made of a wood material and an upper veneer. The base and the veneer are hot-pressed together while incorporating a resin layer. During the pressing process, pores, cracks, and/or gaps in the veneer are filled with resin. In particular, the pressing process is carried out such that the veneer is saturated with resin, and the resin can be seen on the surface of the veneer after the pressing process The adhesion of the veneer to the base and the smoothing of the veneer are thus carried out in one operation.

24 Claims, 1 Drawing Sheet

(51) Int. Cl.
  *E04F 15/00*   (2006.01)
  *B32B 38/00*   (2006.01)
  *E04B 9/00*    (2006.01)
  *B32B 21/04*   (2006.01)
  *B32B 21/13*   (2006.01)
  *B32B 21/14*   (2006.01)
  *B32B 37/10*   (2006.01)
  *E04F 15/04*   (2006.01)
  *B32B 37/12*   (2006.01)
  *B32B 38/06*   (2006.01)
  *E04B 9/04*    (2006.01)
  *E04F 13/10*   (2006.01)
  *B32B 37/06*   (2006.01)

(52) U.S. Cl.
  CPC .............. *B32B 37/12* (2013.01); *B32B 38/06* (2013.01); *E04B 9/045* (2013.01); *E04F 13/10* (2013.01); *E04F 15/042* (2013.01); *E04F 15/045* (2013.01); *B32B 37/06* (2013.01); *B32B 37/1292* (2013.01); *B32B 2260/026* (2013.01); *B32B 2260/046* (2013.01); *B32B 2317/16* (2013.01); *B32B 2419/04* (2013.01); *Y10T 156/1062* (2015.01); *Y10T 156/1066* (2015.01); *Y10T 156/1075* (2015.01); *Y10T 156/1079* (2015.01)

(56) References Cited

U.S. PATENT DOCUMENTS

| | | |
|---|---|---|
| 2,587,064 A | 2/1952 | Rapson |
| 2,630,395 A | 3/1953 | McCullough |
| 2,634,534 A | 4/1953 | Brown |
| 2,695,857 A | 11/1954 | Lewis et al. |
| 2,720,478 A | 10/1955 | Hogg |
| 2,831,793 A | 4/1958 | Elmendorf |
| 2,831,794 A | 4/1958 | Elmendorf |
| 2,932,596 A | 4/1960 | Rayner |
| 2,962,081 A | 11/1960 | Dobry et al. |
| 2,992,152 A | 7/1961 | Chapman |
| 3,032,820 A | 5/1962 | Johnson |
| 3,135,643 A | 6/1964 | Michl |
| 3,286,006 A | 11/1966 | Annand |
| 3,308,013 A | 3/1967 | Bryant |
| 3,325,302 A | 6/1967 | Hosfeld |
| 3,342,621 A | 9/1967 | Point et al. |
| 3,345,234 A | 10/1967 | Jecker et al. |
| 3,392,082 A | 7/1968 | Lloyd |
| 3,426,730 A | 2/1969 | Lawson et al. |
| 3,463,653 A | 8/1969 | Letter |
| 3,486,484 A | 12/1969 | Bullough |
| 3,533,725 A | 10/1970 | Bridgeford |
| 3,540,978 A | 11/1970 | Ames |
| 3,565,665 A | 2/1971 | Stranch et al. |
| 3,578,522 A | 5/1971 | Rauch |
| 3,615,279 A | 10/1971 | Ward, Jr. |
| 3,673,020 A | 6/1972 | De Jaeger |
| 3,729,368 A | 4/1973 | Ingham |
| 3,844,863 A | 10/1974 | Forsythe |
| 3,846,219 A | 11/1974 | Kunz |
| 3,880,687 A | 4/1975 | Elmendorf et al. |
| 3,895,984 A | 7/1975 | Cone et al. |
| 3,897,185 A | 7/1975 | Beyer |
| 3,897,588 A | 7/1975 | Nohtomi |
| 3,914,359 A | 10/1975 | Bevan |
| 3,950,599 A | 4/1976 | Board, Jr. |
| 3,956,542 A | 5/1976 | Roberti |
| 3,961,108 A | 6/1976 | Rosner et al. |
| 4,052,739 A | 10/1977 | Wada et al. |
| 4,093,766 A | 6/1978 | Scher et al. |
| 4,115,178 A | 9/1978 | Cone et al. |
| 4,126,725 A | 11/1978 | Shiflet |
| 4,131,705 A | 12/1978 | Kubinsky |
| 4,277,527 A | 7/1981 | Duhl |
| 4,311,621 A | 1/1982 | Nishizawa et al. |
| 4,313,857 A | 2/1982 | Blount |
| 4,337,290 A | 6/1982 | Kelly et al. |
| 4,361,612 A | 11/1982 | Shaner |
| 4,420,351 A | 12/1983 | Lussi |
| 4,420,525 A | 12/1983 | Parks |
| 4,430,375 A | 2/1984 | Scher et al. |
| 4,430,380 A | 2/1984 | Hönel |
| 4,474,920 A | 10/1984 | Kyminas et al. |
| 4,743,484 A | 5/1988 | Robbins |
| 4,863,777 A | 9/1989 | Callaway et al. |
| 4,872,825 A | 10/1989 | Ross |
| 4,890,656 A | 1/1990 | Ohsumi et al. |
| 4,911,969 A | 3/1990 | Ogata et al. |
| 4,942,084 A | 7/1990 | Prince |
| 5,034,272 A | 7/1991 | Lindgren et al. |
| 5,059,472 A | 10/1991 | LeBell et al. |
| 5,085,930 A | 2/1992 | Widmann et al. |
| 5,147,486 A | 9/1992 | Hoffman |
| 5,206,066 A | 4/1993 | Horacek |
| 5,246,765 A | 9/1993 | Lussi et al. |
| 5,258,216 A | 11/1993 | Von Bonin et al. |
| 5,292,576 A | 3/1994 | Sanders |
| 5,314,554 A | 5/1994 | Owens |
| 5,354,259 A | 10/1994 | Scholz et al. |
| 5,405,705 A | 4/1995 | Fujimoto |
| 5,422,170 A | 6/1995 | Iwata et al. |
| 5,447,752 A | 9/1995 | Cobb |
| 5,466,511 A | 11/1995 | O'Dell et al. |
| 5,543,193 A | 8/1996 | Tesch |
| 5,569,424 A | 10/1996 | Amour |
| 5,601,930 A | 2/1997 | Mehta et al. |
| 5,604,025 A | 2/1997 | Tesch |
| 5,609,966 A | 3/1997 | Perrin et al. |
| 5,755,068 A | 5/1998 | Ormiston |
| 5,766,522 A | 6/1998 | Daly et al. |
| 5,827,788 A | 10/1998 | Miyakoshi |
| 5,855,832 A | 1/1999 | Clausi |
| 5,891,564 A | 4/1999 | Schultz et al. |
| 5,925,211 A | 7/1999 | Rakauskas |
| 5,925,296 A | 7/1999 | Leese |
| 5,942,072 A | 8/1999 | McKinnon |
| 5,976,689 A | 11/1999 | Witt et al. |
| 5,985,397 A | 11/1999 | Witt et al. |
| 6,036,137 A | 3/2000 | Myren |
| 6,103,377 A | 8/2000 | Clausi |
| 6,238,750 B1 | 5/2001 | Correll et al. |
| 6,291,625 B1 | 9/2001 | Hosgood |
| 6,468,645 B1 | 10/2002 | Clausi |
| 6,481,476 B1 | 11/2002 | Okamoto |
| 6,521,326 B1 | 2/2003 | Fischer et al. |
| 6,528,437 B1 | 3/2003 | Hepfinger et al. |
| 6,537,610 B1 | 3/2003 | Springer et al. |
| 6,620,349 B1 | 9/2003 | Lopez |
| 6,667,108 B2 | 12/2003 | Ellstrom |
| 6,769,217 B2 | 8/2004 | Nelson |
| 6,773,799 B1 | 8/2004 | Persson et al. |
| 6,803,110 B2 | 10/2004 | Drees et al. |
| 6,926,954 B2 | 8/2005 | Schuren et al. |
| 6,991,830 B1 | 1/2006 | Hansson et al. |
| 7,022,756 B2 | 4/2006 | Singer |
| 7,485,693 B2 | 2/2009 | Matsuda et al. |
| 7,811,489 B2 | 10/2010 | Pervan |
| 8,021,741 B2 | 9/2011 | Chen |
| 8,206,534 B2 | 6/2012 | McDuff et al. |
| 8,245,477 B2 | 8/2012 | Pervan |
| 8,302,367 B2 | 11/2012 | Schulte |
| 8,349,234 B2 | 1/2013 | Ziegler et al. |
| 8,349,235 B2 | 1/2013 | Pervan et al. |
| 8,407,963 B2 | 4/2013 | Schulte |
| 8,419,877 B2 | 4/2013 | Pervan et al. |
| 8,431,054 B2 | 4/2013 | Pervan et al. |
| 8,480,841 B2 | 7/2013 | Pervan et al. |
| 8,481,111 B2 | 7/2013 | Ziegler et al. |
| 8,499,520 B2 | 8/2013 | Schulte |
| 8,617,439 B2 | 12/2013 | Pervan et al. |
| 8,635,829 B2 | 1/2014 | Schulte |
| 8,650,738 B2 | 2/2014 | Schulte |

(56) References Cited

U.S. PATENT DOCUMENTS

| | | |
|---|---|---|
| 8,663,785 B2 | 3/2014 | Ziegler et al. |
| 8,728,564 B2 | 5/2014 | Ziegler et al. |
| 8,752,352 B2 | 6/2014 | Schulte |
| 8,784,587 B2 | 7/2014 | Lindgren et al. |
| 8,920,874 B2 | 12/2014 | Ziegler et al. |
| 8,920,876 B2 | 12/2014 | Vetter et al. |
| 8,993,049 B2 | 3/2015 | Pervan |
| 9,085,905 B2 | 7/2015 | Persson et al. |
| 9,109,366 B2 | 8/2015 | Schulte |
| 9,181,698 B2 | 11/2015 | Pervan et al. |
| 9,255,405 B2 | 2/2016 | Pervan et al. |
| 9,296,191 B2 | 3/2016 | Pervan et al. |
| 9,352,499 B2 | 5/2016 | Ziegler et al. |
| 9,403,286 B2 | 8/2016 | Vetter et al. |
| 9,410,319 B2 | 8/2016 | Ziegler et al. |
| 9,556,622 B2 | 1/2017 | Pervan et al. |
| 9,783,996 B2 | 10/2017 | Pervan et al. |
| 10,017,950 B2 | 7/2018 | Pervan |
| 10,100,535 B2 | 10/2018 | Pervan et al. |
| 10,214,913 B2 | 2/2019 | Persson et al. |
| 10,286,633 B2 | 5/2019 | Lundblad et al. |
| 10,315,219 B2 | 6/2019 | Jacobsson |
| 2001/0006704 A1 | 7/2001 | Chen et al. |
| 2001/0009309 A1 | 7/2001 | Taguchi et al. |
| 2002/0031620 A1 | 3/2002 | Yuzawa et al. |
| 2002/0054994 A1 | 5/2002 | Dupre et al. |
| 2002/0100231 A1 | 8/2002 | Miller |
| 2002/0155297 A1 | 10/2002 | Schuren |
| 2003/0008130 A1 | 1/2003 | Kaneko |
| 2003/0056873 A1 | 3/2003 | Nakos et al. |
| 2003/0059639 A1 | 3/2003 | Worsley |
| 2003/0102094 A1 | 6/2003 | Tirri et al. |
| 2003/0108760 A1 | 6/2003 | Haas et al. |
| 2003/0208980 A1 | 11/2003 | Miller et al. |
| 2004/0035078 A1 | 2/2004 | Pervan |
| 2004/0088946 A1 | 5/2004 | Liang et al. |
| 2004/0123542 A1 | 7/2004 | Grafenauer |
| 2004/0137255 A1 | 7/2004 | Martinez et al. |
| 2004/0191547 A1 | 9/2004 | Oldorff |
| 2004/0202857 A1 | 10/2004 | Singer |
| 2004/0206036 A1 | 10/2004 | Pervan |
| 2004/0237436 A1 | 12/2004 | Zuber et al. |
| 2004/0250911 A1 | 12/2004 | Vogel |
| 2005/0003099 A1 | 1/2005 | Quist |
| 2005/0016107 A1 | 1/2005 | Rosenthal et al. |
| 2005/0079780 A1 | 4/2005 | Rowe et al. |
| 2005/0136234 A1 | 6/2005 | Hak et al. |
| 2005/0153150 A1 | 7/2005 | Wellwood et al. |
| 2005/0166514 A1 | 8/2005 | Pervan |
| 2005/0193677 A1 | 9/2005 | Vogel |
| 2005/0208255 A1 | 9/2005 | Pervan |
| 2005/0227040 A1 | 10/2005 | Toupalik |
| 2005/0252130 A1 | 11/2005 | Martensson |
| 2006/0008630 A1 | 1/2006 | Thiers et al. |
| 2006/0024465 A1 | 2/2006 | Briere |
| 2006/0032175 A1 | 2/2006 | Chen et al. |
| 2006/0048474 A1 | 3/2006 | Pervan et al. |
| 2006/0070321 A1 | 4/2006 | Au |
| 2006/0070325 A1 | 4/2006 | Magnusson |
| 2006/0145384 A1 | 7/2006 | Singer |
| 2006/0154015 A1 | 7/2006 | Miller et al. |
| 2006/0172118 A1 | 8/2006 | Han et al. |
| 2006/0182938 A1 | 8/2006 | Oldorff |
| 2006/0183853 A1 | 8/2006 | Sczepan |
| 2007/0055012 A1 | 3/2007 | Caldwell |
| 2007/0066176 A1 | 3/2007 | Wenstrup et al. |
| 2007/0102108 A1 | 5/2007 | Zheng |
| 2007/0148339 A1 | 6/2007 | Wescott |
| 2007/0166516 A1 | 7/2007 | Kim et al. |
| 2007/0184244 A1 | 8/2007 | Doehring |
| 2007/0207296 A1 | 9/2007 | Eisermann |
| 2007/0218260 A1 | 9/2007 | Miclo et al. |
| 2007/0224438 A1 | 9/2007 | Van Benthem et al. |
| 2007/0256804 A1 | 11/2007 | Garcis Espino et al. |
| 2008/0000179 A1 | 1/2008 | Pervan et al. |
| 2008/0000190 A1 | 1/2008 | Håkansson |
| 2008/0000417 A1 | 1/2008 | Pervan et al. |
| 2008/0032120 A1 | 2/2008 | Braun |
| 2008/0090032 A1 | 4/2008 | Perrin et al. |
| 2008/0093013 A1 | 4/2008 | Muller |
| 2008/0152876 A1 | 6/2008 | Magnusson |
| 2008/0176039 A1 | 7/2008 | Chen et al. |
| 2008/0263985 A1 | 10/2008 | Hasch et al. |
| 2009/0056257 A1 | 3/2009 | Mollinger et al. |
| 2009/0124704 A1 | 5/2009 | Jenkins |
| 2009/0135356 A1 | 5/2009 | Ando |
| 2009/0145066 A1 | 6/2009 | Pervan |
| 2009/0155612 A1 | 6/2009 | Pervan et al. |
| 2009/0165946 A1 | 7/2009 | Suzuki |
| 2009/0208646 A1 | 8/2009 | Kreuder et al. |
| 2009/0294037 A1 | 12/2009 | Oldorff |
| 2009/0311433 A1 | 12/2009 | Wittmann |
| 2010/0092731 A1 | 4/2010 | Pervan et al. |
| 2010/0136303 A1 | 6/2010 | Kreuder |
| 2010/0196678 A1 | 8/2010 | Vermeulen |
| 2010/0223881 A1 | 9/2010 | Kalwa |
| 2010/0239820 A1 | 9/2010 | Buhlmann |
| 2010/0291397 A1 | 11/2010 | Pervan et al. |
| 2010/0300030 A1 | 12/2010 | Pervan et al. |
| 2010/0304089 A1 | 12/2010 | Magnusson |
| 2010/0307675 A1 | 12/2010 | Buhlmann |
| 2010/0307677 A1 | 12/2010 | Buhlmann |
| 2010/0314368 A1 | 12/2010 | Groeke |
| 2010/0319282 A1 | 12/2010 | Ruland |
| 2010/0323187 A1 | 12/2010 | Kalwa |
| 2010/0330376 A1 | 12/2010 | Trksak |
| 2011/0175251 A1 | 7/2011 | Ziegler et al. |
| 2011/0177319 A1 | 7/2011 | Ziegler et al. |
| 2011/0177354 A1 | 7/2011 | Ziegler et al. |
| 2011/0189448 A1 | 8/2011 | Lindgren et al. |
| 2011/0247748 A1 | 10/2011 | Pervan et al. |
| 2011/0250404 A1 | 10/2011 | Pervan et al. |
| 2011/0262720 A1 | 10/2011 | Riebel et al. |
| 2011/0274872 A1 | 11/2011 | Yu |
| 2011/0283642 A1 | 11/2011 | Meirlaen et al. |
| 2011/0283650 A1 | 11/2011 | Pervan et al. |
| 2011/0287211 A1 | 11/2011 | Bailey et al. |
| 2011/0293823 A1 | 12/2011 | Bruderer et al. |
| 2011/0293906 A1 | 12/2011 | Jacobsson |
| 2012/0048487 A1 | 3/2012 | Brewster |
| 2012/0124932 A1 | 5/2012 | Schulte et al. |
| 2012/0263878 A1 | 10/2012 | Ziegler et al. |
| 2012/0263965 A1 | 10/2012 | Persson et al. |
| 2012/0264853 A1 | 10/2012 | Ziegler et al. |
| 2012/0276348 A1 | 11/2012 | Clausi et al. |
| 2012/0288689 A1 | 11/2012 | Hansson et al. |
| 2012/0308774 A1 | 12/2012 | Persson et al. |
| 2013/0025216 A1 | 1/2013 | Reichwein et al. |
| 2013/0092314 A1 | 4/2013 | Zeigler et al. |
| 2013/0095315 A1 | 4/2013 | Pervan et al. |
| 2013/0111845 A1 | 5/2013 | Pervan et al. |
| 2013/0189534 A1 | 7/2013 | Pervan et al. |
| 2013/0196119 A1 | 8/2013 | Dobecz |
| 2013/0269863 A1 | 10/2013 | Pervan et al. |
| 2013/0273244 A1 | 10/2013 | Vetter et al. |
| 2013/0273245 A1 | 10/2013 | Ziegler et al. |
| 2014/0027020 A1 | 1/2014 | Klaeusler et al. |
| 2014/0044872 A1 | 2/2014 | Pervan |
| 2014/0075874 A1 | 3/2014 | Pervan et al. |
| 2014/0147585 A1 | 5/2014 | Smith |
| 2014/0171554 A1 | 6/2014 | Ziegler et al. |
| 2014/0178630 A1 | 6/2014 | Pervan et al. |
| 2014/0186610 A1 | 7/2014 | Pervan |
| 2014/0199558 A1 | 7/2014 | Pervan et al. |
| 2014/0234531 A1 | 8/2014 | Ziegler et al. |
| 2014/0290171 A1 | 10/2014 | Vermeulen |
| 2015/0017461 A1 | 1/2015 | Lindgren et al. |
| 2015/0072111 A1 | 3/2015 | Rischer et al. |
| 2015/0079280 A1 | 3/2015 | Vetter et al. |
| 2015/0093502 A1 | 4/2015 | Ziegler et al. |
| 2015/0111055 A1 | 4/2015 | Persson et al. |
| 2015/0118456 A1 | 4/2015 | Carlborg et al. |
| 2015/0159382 A1 | 6/2015 | Pervan |
| 2015/0197942 A1 | 7/2015 | Pervan et al. |

(56) References Cited

U.S. PATENT DOCUMENTS

| | | |
|---|---|---|
| 2015/0197943 A1 | 7/2015 | Ziegler et al. |
| 2015/0275526 A1 | 10/2015 | Persson et al. |
| 2015/0298433 A1 | 10/2015 | Kalwa |
| 2016/0031189 A1 | 2/2016 | Pervan et al. |
| 2016/0114495 A1 | 4/2016 | Pervan et al. |
| 2016/0186318 A1 | 6/2016 | Pervan et al. |
| 2016/0230400 A9 | 8/2016 | Pervan et al. |
| 2016/0297174 A1 | 10/2016 | Kim |
| 2016/0322041 A1 | 11/2016 | Kim |
| 2016/0326744 A1 | 11/2016 | Döhring et al. |
| 2016/0368180 A1 | 12/2016 | Ziegler et al. |
| 2016/0369507 A1 | 12/2016 | Pervan et al. |
| 2016/0375674 A1 | 12/2016 | Schulte |
| 2017/0120564 A1 | 5/2017 | Schulte |
| 2017/0165936 A1 | 6/2017 | Schulte |
| 2017/0190156 A1 | 7/2017 | Lundblad et al. |
| 2017/0305119 A1 | 10/2017 | Bergelin et al. |
| 2017/0348984 A1 | 12/2017 | Pervan et al. |
| 2018/0002934 A1* | 1/2018 | Pervan .................... B32B 21/02 |
| 2018/0291638 A1 | 10/2018 | Pervan |
| 2018/0370278 A1 | 12/2018 | Persson et al. |
| 2019/0010711 A1 | 1/2019 | Pervan et al. |

FOREIGN PATENT DOCUMENTS

| | | | |
|---|---|---|---|
| CA | 2 557 096 A1 | 7/2005 | |
| CA | 2 852 656 A1 | 4/2013 | |
| CH | 298894 A | 5/1954 | |
| CN | 1709717 A | 12/2005 | |
| CN | 102166775 A | 8/2011 | |
| CN | 202200608 U | 4/2012 | |
| DE | 1 815 312 A1 | 7/1969 | |
| DE | 7148789 U | 4/1972 | |
| DE | 29 39 828 A1 | 4/1981 | |
| DE | 33 34 921 A1 | 4/1985 | |
| DE | 36 34 885 A1 | 4/1988 | |
| DE | 42 33 050 A1 | 4/1993 | |
| DE | 42 36 266 A1 | 5/1993 | |
| DE | 202 14 532 U1 | 2/2004 | |
| DE | 102 45 914 | 4/2004 | |
| DE | 103 00 247 | 7/2004 | |
| DE | 103 31 657 A1 | 2/2005 | |
| DE | 20 2004 003 061 U1 | 7/2005 | |
| DE | 10 2004 050 278 A1 | 4/2006 | |
| DE | 20 2006 007 797 U1 | 8/2006 | |
| DE | 10 2005 046 264 A1 | 4/2007 | |
| DE | 10 2006 024 593 A1 | 12/2007 | |
| DE | 10 2006 058 244 | 6/2008 | |
| DE | 10 2007 043 202 A1 | 3/2009 | |
| DE | 20 2009 008 367 U1 | 9/2009 | |
| DE | 10 2010 045 266 A | 3/2012 | |
| EP | 0 129 430 A2 | 12/1984 | |
| EP | 0 234 220 A2 | 9/1987 | |
| EP | 0 129 430 B1 | 1/1990 | |
| EP | 0 355 829 A2 | 2/1990 | |
| EP | 0 611 408 A1 | 12/1993 | |
| EP | 0 592 013 A2 | 4/1994 | |
| EP | 0 656 443 A1 | 6/1995 | |
| EP | 0 611 408 B1 | 9/1996 | |
| EP | 0 732 449 A1 | 9/1996 | |
| EP | 0 744 477 A2 | 11/1996 | |
| EP | 0 914 914 A2 | 5/1999 | |
| EP | 0 732 449 B1 | 8/1999 | |
| EP | 0 744 477 B1 | 1/2000 | |
| EP | 0 993 934 A2 | 4/2000 | |
| EP | 1 808 311 A1 | 7/2000 | |
| EP | 1 035 255 A1 | 9/2000 | |
| EP | 1 125 971 A1 | 8/2001 | |
| EP | 1 136 251 A2 | 9/2001 | |
| EP | 1 193 288 A2 | 4/2002 | |
| EP | 1 209 199 A1 | 5/2002 | |
| EP | 1 242 702 A1 | 9/2002 | |
| EP | 1 249 322 A1 | 10/2002 | |
| EP | 1 262 607 A1 | 12/2002 | |
| EP | 1 388 414 A1 | 2/2004 | |
| EP | 1 454 763 A2 | 9/2004 | |
| EP | 1 242 702 B1 | 11/2004 | |
| EP | 1 498 241 A2 | 1/2005 | |
| EP | 1 507 664 A1 | 2/2005 | |
| EP | 1 584 378 A1 | 10/2005 | |
| EP | 1 657 055 | 5/2006 | |
| EP | 1 681 103 A2 | 7/2006 | |
| EP | 1 507 664 B1 | 7/2007 | |
| EP | 1 690 603 A1 | 8/2007 | |
| EP | 1 847 385 A1 | 10/2007 | |
| EP | 1 961 556 A1 | 8/2008 | |
| EP | 1 985 464 A1 | 10/2008 | |
| EP | 1 997 623 A1 | 12/2008 | |
| EP | 2 025 484 A1 | 2/2009 | |
| EP | 1 454 763 B1 | 8/2009 | |
| EP | 2 105 320 A1 | 9/2009 | |
| EP | 2 119 550 A1 | 11/2009 | |
| EP | 2 213 476 A1 | 8/2010 | |
| EP | 2 226 201 A1 | 9/2010 | |
| EP | 2 246 500 A2 | 11/2010 | |
| EP | 2 263 867 A1 | 12/2010 | |
| EP | 2 264 259 A2 | 12/2010 | |
| EP | 2 272 667 A1 | 1/2011 | |
| EP | 2 272 668 A1 | 1/2011 | |
| EP | 2 305 462 A1 | 4/2011 | |
| EP | 1 847 385 B1 | 9/2011 | |
| EP | 2 415 947 A2 | 2/2012 | |
| EP | 2 263 867 B1 | 3/2012 | |
| EP | 2 902 196 A1 | 1/2014 | |
| FR | 801 433 A | 8/1936 | |
| FR | 2 873 953 A1 | 2/2006 | |
| GB | 984 170 A | 2/1965 | |
| GB | 1090450 | 11/1967 | |
| GB | 1 561 820 A | 3/1980 | |
| GB | 2 238 983 A | 6/1991 | |
| GB | 2 248 246 A | 4/1992 | |
| GB | 2 464 541 A | 4/2010 | |
| JP | S51-128409 A | 11/1976 | |
| JP | S52-087212 A | 7/1977 | |
| JP | S56-049259 A | 5/1981 | |
| JP | S56-151564 A | 11/1981 | |
| JP | S58-084761 A | 5/1983 | |
| JP | S59-101312 A | 6/1984 | |
| JP | S64-062108 A | 3/1989 | |
| JP | H02-198801 A | 8/1990 | |
| JP | H02-229002 A | 9/1990 | |
| JP | H03-030905 A | 2/1991 | |
| JP | H03-211047 A | 9/1991 | |
| JP | H03-267174 A | 11/1991 | |
| JP | H04-107101 A | 4/1992 | |
| JP | H04-247901 A | 9/1992 | |
| JP | H04-269506 A | 9/1992 | |
| JP | H05-077362 A | 3/1993 | |
| JP | H05-237809 A | 9/1993 | |
| JP | H06-312406 A | 11/1994 | |
| JP | H08-207012 A | 8/1996 | |
| JP | H09-164651 A | 6/1997 | |
| JP | 10018562 A * | 1/1998 | ............ E04F 15/04 |
| JP | H10-002098 A | 1/1998 | |
| JP | H11-291203 A | 10/1999 | |
| JP | 2000-226931 A | 8/2000 | |
| JP | 2000-263520 A | 9/2000 | |
| JP | 2001-287208 A | 10/2001 | |
| JP | 2001-329681 A | 11/2001 | |
| JP | 2003-311717 A | 11/2003 | |
| JP | 2003-311718 A | 11/2003 | |
| JP | 2004-068512 A | 3/2004 | |
| JP | 2004-076476 A | 3/2004 | |
| JP | 2005-034815 A | 2/2005 | |
| JP | 2005-074682 A | 3/2005 | |
| JP | 2005-170016 A | 6/2005 | |
| JP | 2005-219215 A | 8/2005 | |
| JP | 3705482 B2 | 10/2005 | |
| JP | 2005-307582 A | 11/2005 | |
| JP | 2007098755 A * | 4/2007 | ............ B27M 3/04 |
| JP | 2007-216692 A | 8/2007 | |
| JP | 2007-268843 A | 10/2007 | |
| JP | 2008-188826 A | 8/2008 | |
| JP | 2010-017963 A | 1/2010 | |

(56) References Cited

FOREIGN PATENT DOCUMENTS

| | | |
|---|---|---|
| JP | 2011-110768 A | 6/2011 |
| KR | 10-0997149 B1 | 11/2010 |
| KR | 10-1439066 B1 | 9/2014 |
| NZ | 225556 A1 | 2/1992 |
| SE | 469 326 B | 6/1993 |
| WO | WO 92/06832 A1 | 4/1992 |
| WO | WO 93/24295 A1 | 12/1993 |
| WO | WO 93/24296 A1 | 12/1993 |
| WO | WO 94/00280 A1 | 1/1994 |
| WO | WO 95/06568 A1 | 3/1995 |
| WO | WO 00/22225 A1 | 4/2000 |
| WO | WO 00/44576 A1 | 8/2000 |
| WO | WO 01/00409 A1 | 1/2001 |
| WO | WO 01/48333 A1 | 7/2001 |
| WO | WO 01/64408 A1 | 9/2001 |
| WO | WO 01/68367 A1 | 9/2001 |
| WO | WO 01/92037 A2 | 12/2001 |
| WO | WO 02/42167 A2 | 5/2002 |
| WO | WO 02/42373 A1 | 5/2002 |
| WO | WO 03/078761 A1 | 9/2003 |
| WO | WO 03/095202 A1 | 11/2003 |
| WO | WO 2004/042168 A1 | 5/2004 |
| WO | WO 2004/050359 A1 | 6/2004 |
| WO | WO 2004/067874 A2 | 8/2004 |
| WO | WO 2005/035209 A2 | 4/2005 |
| WO | WO 2005/035209 A3 | 4/2005 |
| WO | WO 2005/035209 B1 | 4/2005 |
| WO | WO 2005/054599 A1 | 6/2005 |
| WO | WO 2005/054600 A1 | 6/2005 |
| WO | WO 2005/066431 A2 | 7/2005 |
| WO | WO 2005/080096 A2 | 9/2005 |
| WO | WO 2005/097874 A2 | 10/2005 |
| WO | WO 2005/116337 A1 | 12/2005 |
| WO | WO 2005/116361 A1 | 12/2005 |
| WO | WO 2006/007413 A1 | 1/2006 |
| WO | WO 2006/013469 A1 | 2/2006 |
| WO | WO 2006/015313 A2 | 2/2006 |
| WO | WO 2006/042651 A1 | 4/2006 |
| WO | WO 2006/043893 A1 | 4/2006 |
| WO | WO 2006/066776 A2 | 6/2006 |
| WO | WO 2006/126930 A1 | 11/2006 |
| WO | WO 2007/015669 A2 | 2/2007 |
| WO | WO 2007/015669 A3 | 2/2007 |
| WO | WO 2007/042258 A1 | 4/2007 |
| WO | WO 2007/059294 A2 | 5/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/148771 A1 | 12/2008 |
| WO | WO 2009/015682 | 2/2009 |
| WO | WO 2009/050565 A1 | 4/2009 |
| WO | WO 2009/065768 A1 | 5/2009 |
| WO | WO 2009/065769 A2 | 5/2009 |
| WO | WO 2009/065769 A3 | 5/2009 |
| WO | WO 2009/080772 A1 | 7/2009 |
| WO | WO 2009/080813 A1 | 7/2009 |
| WO | WO 2009/116926 A1 | 9/2009 |
| WO | WO 2009/124704 A1 | 10/2009 |
| WO | WO 2010/046698 A1 | 4/2010 |
| WO | WO 2010/084466 A2 | 7/2010 |
| WO | WO 2010/087752 A1 | 8/2010 |
| WO | WO 2010/094500 A1 | 8/2010 |
| WO | WO 2011/058233 A1 | 5/2011 |
| WO | WO 2011/087422 A1 | 7/2011 |
| WO | WO 2011/087423 A1 | 7/2011 |
| WO | WO 2011/087424 A1 | 7/2011 |
| WO | WO 2011/129755 A2 | 10/2011 |
| WO | WO 2011/129757 A1 | 10/2011 |
| WO | WO 2011/141851 A2 | 11/2011 |
| WO | WO 2012/004699 A2 | 1/2012 |
| WO | WO 2012/076608 A1 | 6/2012 |
| WO | WO 2012/141647 A1 | 10/2012 |
| WO | WO 2012/154113 A1 | 11/2012 |
| WO | WO 2013/056745 A1 | 4/2013 |
| WO | WO 2013/079950 A1 | 6/2013 |
| WO | WO 2013/139460 A1 | 9/2013 |
| WO | WO 2013/167576 A2 | 11/2013 |
| WO | WO 2013/182191 A2 | 12/2013 |
| WO | WO 2013/182191 A3 | 12/2013 |
| WO | WO 2014/017972 A1 | 1/2014 |
| WO | WO 2014/109699 A1 | 7/2014 |
| WO | WO 2015/078434 A1 | 6/2015 |
| WO | WO 2015/078443 A1 | 6/2015 |
| WO | WO 2015/078444 A1 | 6/2015 |
| WO | WO 2015/105455 A1 | 7/2015 |
| WO | WO 2015/105456 A1 | 7/2015 |
| WO | WO 2015/106771 A1 | 7/2015 |

OTHER PUBLICATIONS

International Search Report issued by the European Patent Office in International Application PCT/DE2014/100106.
U.S. Appl. No. 14/593,458, filed Jan. 9, 2015, Göran Ziegler.
U.S. Appl. No. 14/593,521, filed Jan. 9, 2015, Darko Pervan.
U.S. Appl. No. 15/183,424, filed Jun. 15, 2016, Darko Pervan.
U.S. Appl. No. 15/308,737, filed Nov. 3, 2016, Christer Lundblad.
U.S. Appl. No. 15/496,357, filed Apr. 25, 2017, Marcus Bergelin.
U.S. Appl. No. 15/039,748, filed May 26, 2016, Guido Schulte.
U.S. Appl. No. 15/039,504, filed May 26, 2016, Guido Schulte.
Parquet International, "Digital Printing is still an expensive process," Mar. 2008, cover page/pp. 78-79, www.parkettmagazin.com.
Floor Daily, "Shaw Laminates: Green by Design," Aug. 13, 2007, 1 pg, Dalton, GA.
BTLSR Toledo, Inc. website. http://www.btlresins.com/more.html. "Advantages to Using Powdered Resins," May 26, 2007, 2 pages, per the Internet Archive WayBackMachine.
Nimz, H.H., "Wood," Ullmann's Encyclopedia of Industrial Chemistry, published online Jun. 15, 2000, pp. 453-505, vol. 39, Wiley-VCH Verlag GmbH & Co. KgaA, Weinheim, DE.
Le Fur, X., et al., "Recycling melamine-impregnated paper waste as board adhesives," published online Oct. 26, 2004, pp. 419-423, vol. 62, Springer-Verlag, DE, XP055332791.
Odian, George, "Principles of Polymerization," 1991, $3^{rd}$ Edition, 5 pages incl. pp. 122-123, John Wiley & Sons, Inc., New York, NY, USA.
Engstrand, Ola (Contact)/Valinge Innovation, Technical Disclosure entitled "Fibre Based Panels With a Wear Resistance Surface," Nov. 17, 2008, IP.com No. IPCOM000176590D, IP.com PriorArtDatabase, 76 pages.
Engstrand, Ola (Contact)/Valinge Innovation, Technical Disclosure entitled "WFF Embossing," May 15, 2009, IP.com No. IPCOM000183105D, IP.com PriorArtDatabase, 36 pages.
Engstrand, Ola (Contact)/Valinge Innovation, Technical Disclosure entitled "VA063 VA064 Scattering and Powder Backing," Nov. 11, 2011, IP.com No. IPCOM000212422D, IP.com PriorArtDatabase, 34 pages.
U.S. Appl. No. 16/223,708, Ziegler, et al.
U.S. Appl. No. 16/223,833, Ziegler, et al.
U.S. Appl. No. 16/325,543, Ziegler.
Lstiburek, Joseph, "BSD-106: Understanding Vapor Barriers," Apr. 15, 2011, *Building Science Corporation*, pp. 1-18; (retrieved Sep. 26, 2018 https://buildingscience.com/documents/digests/bsd-106-understanding-vapor-barriers).
Mercene Labs, official home page, retrieved Feb. 23, 2017, retrieved from the Internet: http://www.mercenelabs.com/technology/, according to the Internet Archive WayBack Machine this page was available on Jan. 22, 2013.
**Ziegler, Göran, et al., U.S. Appl. No. 16/223,708 entitled "A Method to Produce a Veneered Element and a Veneered Element," filed in the U.S. Patent and Trademark Office on Dec. 18, 2018.
**Ziegler, Göran, et al., U.S. Appl. No. 16/223,833 entitled "A Method to Produce a Veneered Element and a Veneered Element," filed in the U.S. Patent and Trademark Office on Dec. 18, 2018.
**Ziegler, Göran, U.S. Appl. No. 16/325,543 entitled "A Method to Coat a Building Panel and Such a Coated Building Panel," filed in the U.S. Patent and Trademark Office on Feb. 14, 2019.
U.S. Appl. No. 16/365,764, Lundblad et al.

(56) References Cited

OTHER PUBLICATIONS

\*\*Lundblad, Christer, et al., U.S. Appl. No. 16/365,764 entitled "A Method of Producing a Veneered Element and Such a Veneered Element," filed in the U.S. Patent and Trademark Office on Mar. 27, 2019.

\* cited by examiner

FLOOR, WALL, OR CEILING PANEL AND METHOD FOR PRODUCING SAME

CROSS-REFERENCES TO RELATED APPLICATIONS

This application is the U.S. National Stage of International Application No. PCT/DE2014/100106, filed Mar. 27, 2014, which designated the United States and has been published as International Publication No. WO 2015/078434 and which claims the priority of German Patent Application, Serial No. 10 2013 113 125.5, filed Nov. 27, 2013, pursuant to 35 U.S.C. 119(a)-(d).

BACKGROUND OF THE INVENTION

The invention relates to a floor, wall, or ceiling panel, which has a carrier plate and a topside veneer, and a method for the production of such a floor, wall, or ceiling panel.

Panels with a top or cover layer of real wood are in particular used as real wood floors or parquet floors. Such floors provide a natural living atmosphere. They feel pleasantly warm underfoot and compensate humidity fluctuations in the room air, which contributes to a healthy room atmosphere. Also very popular are floor boards with a top or cover layer made of cork or a cork veneer.

A method for producing parquet or veneer floorboards with a top layer of real wood is described in DE 102 45 914 A1. In this reference a top layer of real wood is impregnated with thermosetting synthetic resins. After impregnation the top layer is glued to the carrier plate. The top layer is also printed.

Common are floor panels with a three-layer construction and profiled joining surfaces at the side borders for forming joining means in the form of groove and tongues or a so-called click system. The joining means enable a mechanical coupling of the individual panels with each other in a floor covering or a wall or ceiling covering. The carrier plate is usually made of a wood material, in particular a highly compressed fiber plate (HDF). The topside cover layer of real wood can have different thicknesses. In parquet floors the cover layer of wood has a thickness of more than 2.5 mm. According to a common terminology used in the art, veneers for cover layers of floor panels start at about 0.4 mm. Generally floor panels with wood cover layers of smaller than 2.5 mm are referred to as real wood or veneer floors.

After the gluing of the veneer flaws in the surface, for example branch holes or cracks, are smoothened. Usually an excess of smoothening compound is used and subsequently removed again. This is usually performed by grinding or brushing. In particular in the case of thin veneer layers this involves the risk that the subsequent mechanical processing may damage the layer. For this reason oftentimes veneers are used that are thicker to begin with or veneers that have flaws are sorted out beforehand. However, this is uneconomical and also diminishes the variability of the optical appearance of the natural wood floors.

Also known is a so-called real wood laminate. In this case an overlay is applied to the cover layer made of veneer for example in the form of a melamine paper or melamine film. Subsequently this sandwich is then pressed. A disadvantage is that the flaws naturally occurring in this product, such as gaps, cracks, branches or pores oftentimes appear milky. The cause for this is the missing or insufficient pressing pressure during the pressing process because in the region of the flaws the counter pressure is absent. On the other hand when a higher pressure is applied, the texture of the press plate dominates the wood surface and the natural wood texture or optic suffers.

SUMMARY OF THE INVENTION

In light of the state of the art the invention is based on the object to provide a floor, wall, or ceiling panel which can be manufactured cost-effectively and has a high quality and an improved natural optic, and a method for producing such a floor-, wall- or ceiling-panel.

The part of the object relating to the device is solved with a floor-, wall- or ceiling panel according to the independent apparatus claim. The part of the object relating to the method is solved with the independent method claim.

Advantageous embodiments, refinements and aspects of the invention are the subject matter of the dependent claims.

The present invention relates in particular to real wood or veneer floor panels with a veneer made of wood and a thickness of the veneer of smaller than 2.5 mm, in particular with a thickness between 0.6 mm and 1.2 mm. The veneer can also be a cork veneer, in particular an oak cork veneer.

The carrier plate is a plate material made of a wood material, such as for example solid wood, chipboard, wood fiber material, MDF (Medium Density Fiber Board) or HDF (High Density Fiber Board). Within the scope of the invention preferably a carrier plate made of HDF is used. The starting product in the production of floor-, wall- or ceiling panels according to the invention is a large-area carrier plate, in the present case also referred to as basic carrier plate. Such a large-area carrier plate is configured rectangular and has a size of 2,000 mm to 5,000 mm in length and 1,200 mm to 2,100 mm in width. Usually the carrier plate or the basic carrier plate has a thickness of 5 mm to 12 mm. Also conceivable are waterproof materials for example based on mineral materials such as fiber-cement, sand-binding-mixtures or wood-plastic-composite materials (wood-plastic-composites WPC) and wood fiber polymer composite materials or also the use of magnesite plates. According to one aspect natural-fiber-reinforced plastic is used as work material for the carrier plate or the basic carrier plate. Beside wood fibers also other plant fibers such as jute or flax can be used, in particular in a wood fiber or wood powder proportion of 50% to 90% and a plastic matrix of polypropylene (PP). Further a wood-plastic-composite based on thermoplastically processible thermoplasts, such as modified melamine resin with a natural fiber or natural powder proportion can be used. In this connection also bamboo-plastic-composites (BPC) offers interesting practical approaches. In this material bamboo fibers or bamboo powder are used as natural material.

As mentioned above, also plates based on cement-containing binders or fiber cement plates can be used as carrier plate. Also magnesite plates. Magnesite plates are made of a mixture of magnesium oxide, calcium carbonate, silicates and fibers, in particular wood and/or glass fibers. An advantage of magnesite plates is the low weight and the low heat conductivity as wells as their flame resistance. Magnesite plates are categorized as non-flammable.

The core of the invention is that between the carrier plate and the veneer a resin layer is provided and the carrier plate, the resin layer and the veneer are pressed with each other and are joined with each other. The resin of the resin layer permeates or impregnates the veneer. The pressing is performed hot at a temperature, which essentially depends on the resin material.

Preferably the pressing is performed at a temperature of more than 100° C., preferably at a temperature of between 100° C. and 140° C. The pressing temperature relates to the temperature at the press plate of the pressing tool. This temperature is also present at the contact surfaces of the pressing plate with the topside of the veneer or the bottom side of the carrier plate. In the case of thermosetting resins or reactive resins higher temperatures are required. In particular the pressing is performed at a temperature between 180° C. and 210° C.

In the case of resins in the form of urea-formaldehyde-condensation products the pressing temperatures are lower, in particular in a range between 100° C. and 140° C. In these resin materials also temperatures of 80° C. may be sufficient.

The resin layer is made of a resin. The resin is in particular a polyvinyl acetate (short PVAc) i.e., a thermoplastic plastic. Particularly preferably the resin layer is a polymer resin, in particular a urea-formaldehyde-condensation product as it is sold by the company BASF under the trade name and registered trademark "KAURIT". Preferably a pulverous melt-formed urea-formaldehyde-condensation product is used. The resin of the resin layer can also be a thermosetting synthetic resin. Colored or transparent resins or colored urea resins, colored urea-melamine or colored melamine-polyurethane mixtures or colored polymer resins can be used. According to an aspect of the invention resins are used that cure and react under the influence of heat. In this connection the use of aminoplastic polyurethane or reactive resins such as polyurethane (PUR) or thermoplastic polyurethane is advantageous. The resin or the resin layer is preferably present or configured as resin film.

An important aspect of the invention is the use of Kaurit resins, in particular Kaurit glues. Particularly appropriate are Kaurit powder glues, which are mixed with water and hardener. This leads to a particularly effective penetration of the pores in the veneer. The resin ensures a good penetration into the veneer layer. In this connection a coloring of the Kaurit glue, for example with black or brown dies is advantageous in order to make the otherwise invisible Kaurit glue visible. For optimization purposes fillers are added to the resin mixture for example in the form of wood fibers, wood chips, cellulose fibers, cork powders, stone powders and other or similar natural fillers.

The resin layer can be applied as powder or as a liquid, in particular a highly pasty film. For application on the basic plate a watery resin solution is produced. An advantageous mixture ratio consists of two weight parts of resin powder and one weight part of water.

Preferably the resin layer is colored, in particular black or brown. This is accomplished in particular by adding color or dyeing agents, for example color pigments to the resin powder.

A further optimization of resin mixtures is accomplished by adding fillers, in particular wood fibers, woodchips, cellulose fibers, cork powder or stone powders and the like, in particular natural additives.

For producing a floor-, wall- or ceiling panel according to the invention a large-area or large dimension basic carrier plate and a veneer are produced in plate shape in the desired size. Hereby the veneers are placed on as strips or as composite (glued or stitched) veneer or as a broad rotary-cut veneer that is adapted to the format of the basic carrier plate. A multilayer body is formed including the basic carrier plate and the veneer. Between the basic plate and the veneer a resin layer is interposed. On the bottom side of the carrier plate a balancing layer is arranged. The thusly formed multilayer body is then pressed in a pressing tool so that the basic carrier plate, the resin layer, the veneer and the balancing layer are joined. The pressing of the multilayer body is carried out in a pressing tool, i.e., at a pressing pressure adjusted to the product.

When using a resin layer of amino plastic, thermosetting or reactive resins such as polyurethane (PUR) or thermoplastic polyurethane, a pressing pressure of greater than or equal to (≥) 1000 Kilopascal (kPA) is regarded appropriate. Preferably the pressing pressure is above 3500 Kilopascal (kPa). The pressing temperature is hereby greater than or equal to (≥) 120° C. preferably the pressing temperature is between 180° C. and 120° C. when the resin layer is made of a polymer resin, in particular a urea formaldehyde condensation product, the pressing is carried out at a pressing pressure of greater than or equal to (≥) 100 Kilopascal (kPa). The pressing is hereby carried out at a pressing temperature which is preferably between 100° C. and 140° C.

The pressing temperature relates to the temperature at the press plate of the pressing tool. Within the framework of the method according to the invention the pressing time during which the multilayer body is impinged in the pressing tool with pressure is between 10 seconds and 60 seconds. In the case of resin layers based on polymer resins the pressing time is preferably between 20 seconds and 25 seconds.

During the pressing process the surface of the veneers may be provided with a texture, a pattern or ornaments by a texturizing plate or a texturizer. The glossiness of the texture can vary in subregions. Further different texture depths are possible. The depth of the texture can be up to 0.6 mm. Relative to the veneer thickness the texture can have a depth of ⅔ of the veneer thickness.

After the pressing process the pressed multilayer body is separated into individual panels. In a subsequent work step the individual panels are then profiled at their side borders. The profiling is carried out only after the carrier plate has cooled to room temperature. The profiling serves in particular for forming joining means at the longitudinal and transverse sides.

The division of the pressed multilayer body is performed after cooling. For this the multilayer body can be passed over a cooling path or can be intermediately stored for cooling.

As pressing tool in particular a short-contact press is used or a continuous press. During the hot pressing process or the pressing process under the influence of temperature the resin layer is plasticized and penetrates into the veneer. An important aspect of the invention is that the resin of the resin layer permeates the veneer up to the topside of the veneer. Hereby pores, cracks, gaps and/or other flaws in the veneer are filled with resin during the pressing process. The resin of the resin layer forms an inseparable connection between the veneer and the carrier plate. A particular advantage of the invention is thus that two production steps, i.e., gluing and smoothening of the veneer are performed in one step.

In particular the pressing of the multilayer body is performed so that the resin permeates the veneer and after the pressing the resin is visible at the surface of the veneer. In this connection in particular resins whose color is coordinated with the color of the veneer are used. In terms of production a black resin is regarded as universally advantageous. Suitably the pressing is performed so that only very little or no resin at all sticks to the surface of the veneer. Pores, cracks, gaps or other flaws are visibly filled. However, no or only very little excess resin exits on the surface. The pressed product then only has to be texture brushed and may be provided with a surface oil treatment or varnishing.

An alternative provides that the resin layer is formed by a resin film that is applied on the topside of the carrier plate. Hereby the resin is applied to the carrier plate in liquid form and is partially dried or pre-condensed. The resin film adheres to the carrier plate as a gel or wax-like layer.

The resin layer can also be formed on the bottom side of the veneers in the form of a resin film. Also in this case the resin is applied in liquid form on a side of the veneers. As a result the veneers are impregnated with resin. The resin applied in liquid form is partially dried and pre-condensed. The thus impregnated veneer provided with the resin layer is further processed after producing the resin layer. Prior to forming the multilayer body, the veneers are rotated so that the resin layer is on the bottom side of the veneers and comes into contact with the topside of the starting carrier plate.

A resin film can also be formed by applying resin in powder form onto the surface of the starting carrier plate or onto the veneers. The pulverous resin is then melted under heat influence so that the resin film forms.

Generally the resin can also be present or processed paste-like, i.e., in the form of a paste.

The amount of resin is dosed so that it infiltrates or permeates through the veneer, however it cannot exit onto the surface of the veneer as a result of the closed press. Pores flaws, cracks or gaps in the veneer are pressed with resin and filled. The natural wood surface or cork surface and structure remains preserved. The resin can be thickened with a filler. As a result more mass is present in order to fill pores cracks gaps and/or flaws. As filler organic or inorganic materials can be used, in particular mineral pigments, stone powder or chalk, as well as wood powder or wood powder.

The balancing layer compensates tensions in the multilayer body. The balancing layer can be a veneer, a paper, a foil or a film in particular a plastic resin film. Advantageously a balancing veneer or a balancing paper is also provided with resin or impregnated with plastic resin. The balancing layer is pressed during production of the floor, wall, or ceiling panel according to the invention together with the basic carrier plate, the veneer and the resin layer and connected on the bottom side with the basic carrier plate.

The panels are profiled at their side borders and provided with joining means. Joining means can be configured as groove and tongues. Preferably the side borders are provided with a click joint. The panels can also be provided with a circumferential chamfer at their topside borders. In the case of a panel with chamfer the intermediate resin layer has a very positive effect on the humidity sealing in the installed product.

A color design of the panels is also possible when the resin remains visible at the side borders. In particular this is accomplished by a colored resin, which is color coordinated with the veneer. Hereby individual or all side borders can be configured with a visible border strip of resin. A different visual appearance of a panel results when using a resin whose color contrasts that of the veneer. This for example allows generating a specific visual appearance of the joint in a targeted manner. The interplay between resin and veneer enables visually accentuating the surface of a floor-, wall- or ceiling panel according to the invention. For this purpose also effect material in the resin such as pigments and other fillers for example glimmer can be used.

A further aspect is to form the chamfer as a decorative optically delimiting edge. The veneer can also be printed with a decor. Preferably the printing is performed by means of digital printing. Hereby a system of printing inks is used that is adapted to the used resins. It is possible to apply a sealing to the veneer. The term sealing means the application of color, a pickle or an oil or a varnish or varnish system.

It is particularly advantageous that the panel or the surface of the veneer can be subjected to a mechanical processing after the pressing. A surface treatment includes in particular a grinding or a brushing of the surface. This allows accentuating the natural visual appearance of the surface. By unevenly treating the surface an aged texture or look, a so-called vintage effect, can be achieved. The surface of the boards can thus for example have a rough-sewn surface or chatter marks or grinding flaws or the like.

A further aspect of the invention provides that during the pressing a texture is embossed into the veneer, in particular into the surface of the veneer. This also contributes to the particularly elegant and decorative surface. The embossing process also advantageously supports the penetration of the resin material into the veneer.

A floor-, wall- or ceiling panel according to the invention can be cost-effectively produced and is of high quality. The panels are compelling in their natural wood optic or cork optic with a rustic character due to the optically perceptible filled cracks, gaps and/or branch holes. Because the veneer, i.e., the topside wear surface or cover layer of the panel is permeated or impregnated with resin, in addition the resistance, in particular the impact resistance and the wear resistance, is increased. The increased resistance enables mechanical processing of the veneer for example by grinding or brushing with a lower risk that the optic is destroyed by the mechanical processing. The boards are significantly more durable. The invention advantageously enables also using softer woods or veneers made of softer woods such as larch. As a result of the resin impregnation or permeation a veneer made of a soft wood becomes harder and more durable.

Within the framework of the invention also advantageously vapored or smoked veneers can be used. Particularly suited are further veneers made of coarse pored woods such as oak, ash larch or spruce as well as veneers made of cork. The quality of the veneers is improved and the veneers are optically accentuated by the resin infiltration according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
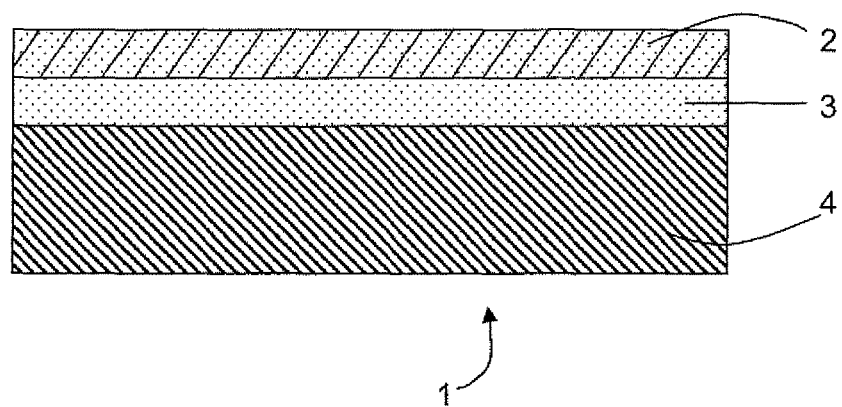
FIG. 1 shows a cross sectional view of a panel according to an embodiment of the invention.

FIG. 1 shows a cross sectional view of a panel 1 according to an embodiment of the invention. The panel 1 includes a veneer 2, a resin layer 3 and a carrier plate 4.

Figure 2:
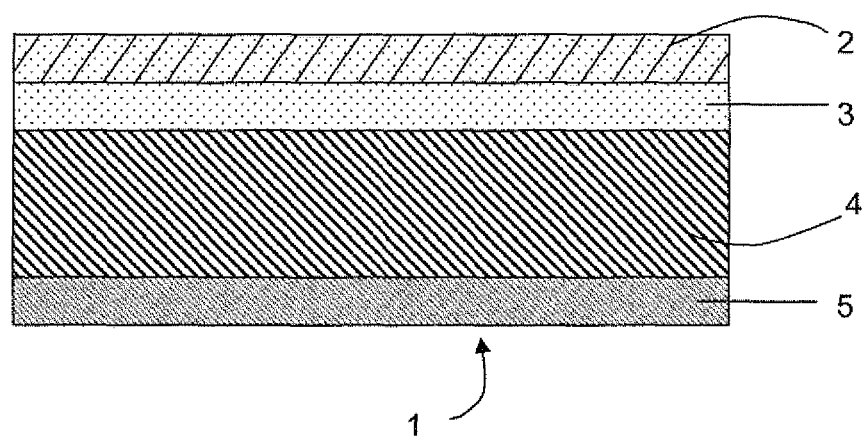
FIG. 2 shows a cross sectional view of a panel according to another embodiment of the invention.

FIG. 2 shows a cross sectional view of a panel 1 according to another embodiment of the invention. In this embodiment the panel 1 further includes a balancing plate 5 arranged on the bottom side of the carrier plate 4.

The invention claimed is:

1. A method for producing panels, said method comprising:
   providing a basic carrier plate, the basic carrier plate comprising a top surface and a bottom surface;
   providing a veneer, the veneer possessing pores, cracks, and/or gaps;
   applying a resin layer on the top surface of the basic carrier plate, the resin layer being applied as a powder;
   forming a multilayer body comprising the basic carrier plate, the veneer, the resin layer interposed between the basic carrier plate and the veneer, and a balancing layer arranged on the bottom surface of the basic carrier plate;
   joining the basic carrier plate, the resin layer, the veneer, and the balancing layer by pressing the multilayer body in a press, wherein a pressing pressure, a pressing temperature and a pressing time are adjusted so that during the pressing of the multilayer body in the press, the pores, the cracks, and/or the gaps in the veneer are filled with resin from the resin layer
   separating the pressed multilayer body into individual panels; and
   profiling the panels at side borders of the panels and providing the panels with joining means,
   wherein the pressing of the multilayer body is carried out so that the resin permeates through the veneer so that after the pressing the resin is visible at a surface of the veneer.

2. The method of claim 1, wherein the resin layer is formed by a polymer resin or a urea formaldehyde condensation product.

3. The method of claim 2, wherein
   the press comprises a press plate, and
   the press plate is heated to a temperature of between 100° C. and 140° C. during the pressing in the press.

4. The method of claim 1, wherein the resin layer comprises wood fibers admixed to the powder.

5. The method of claim 1, further comprising printing a decor on the veneer.

6. The method of claim 1, further comprising applying a sealing to the veneer.

7. The method of claim 1, further comprising after the pressing, subjecting the veneer to a mechanical surface processing comprising a grinding process and/or a brushing process.

8. The method of claim 1, further comprising embossing a texture into the veneer during the pressing in the press.

9. The method of claim 1, wherein the base carrier plate is rectangular with a length of 2,000 mm to 5,000 mm and a width of 1,200 mm to 2,100 mm.

10. The method of claim 1, wherein the pressing comprising simultaneously subjecting the multilayer body to a temperature of between 100° C. and 140° C.

11. The method of claim 1, wherein
   the press comprises a press plate,
   the resin of the resin layer is a thermosetting resin, and
   the press plate is heated to a temperature of between 180° C. and 210° C. during the pressing in the press.

12. The method of claim 1, wherein the resin of the resin layer is a polyvinyl acetate.

13. The method according to claim 1, wherein the pressing is performed at greater than or equal to 3500 kPA for between 10 seconds and 60 seconds.

14. The method according to claim 1, further comprising cooling the multilayer body to room temperature before separating the multilayer body into the individual panels.

15. The method according to claim 1, wherein the balancing layer is a second veneer.

16. The method according to claim 1, further comprising providing a circumferential chamfer at a top border of the panels after the separating of the pressed multilayer body into individual panels.

17. The method according to claim 1, wherein the basic carrier plate has a thickness of between 5 mm and 12 mm, and the veneer has a thickness of between 0.6 mm and 1.2 mm.

18. The method according to claim 1, wherein
   the resin layer comprises wood fibers, and
   the wood fibers and the resin fill the pores, the cracks, and/or the gaps in the veneer during the pressing.

19. A method for producing panels, said method comprising:
   providing a basic carrier plate, the basic carrier plate comprising a top surface and a bottom surface;
   providing a veneer, the veneer being a single wood component, the veneer possessing pores, cracks, and/or gaps;
   applying a resin layer on the top surface of the basic carrier plate;
   forming a multilayer body comprising the basic carrier plate, the single veneer, the resin layer interposed between the basic carrier plate and the single veneer, and a balancing layer arranged on the bottom surface of the basic carrier plate;
   joining the basic carrier plate, the resin layer, the veneer, and the balancing layer by pressing the multilayer body in a press, wherein a pressing pressure, a pressing temperature and a pressing time are adjusted so that during the pressing of the multilayer body in the press, the pores, the cracks, and/or the gaps in the veneer are filled with resin from the resin layer
   separating the pressed multilayer body into individual panels; and
   profiling the panels at side borders of the panels and providing the panels with joining means,
   wherein the pressing of the multilayer body is carried out so that the resin permeates through the veneer so that after the pressing the resin is visible at a surface of the veneer,
   wherein the resin layer is applied as a watery resin solution,
   wherein the watery resin solution consists of two weight parts of resin powder and one weight part of water.

20. A method for producing panels, said method comprising:
   providing a basic carrier plate, the basic carrier plate comprising a top surface and a bottom surface;
   providing a veneer, the veneer possessing pores, cracks, and/or gaps;
   applying a resin layer on the top surface of the basic carrier plate;
   forming a multilayer body comprising the basic carrier plate, the veneer, the resin layer interposed between the basic carrier plate and the veneer, and a balancing layer arranged on the bottom surface of the basic carrier plate;
   joining the basic carrier plate, the resin layer, the veneer, and the balancing layer by pressing the multilayer body in a press, wherein a pressing pressure, a pressing temperature and a pressing time are adjusted so that during the pressing of the multilayer body in the press, the pores, the cracks, and/or the gaps in the veneer are filled with resin from the resin layer separating the pressed multilayer body into individual panels; and profiling the panels at side borders of the panels and providing the panels with joining means, wherein the pressing of the multilayer body is carried out so that the resin permeates through the veneer so that after the pressing the resin is visible at a surface of the veneer, and wherein the pressing is performed at greater than or equal to 1000 kPA for between 10 seconds and 60 seconds.

21. A method for producing panels, said method comprising:

providing a basic carrier plate, the basic carrier plate comprising a top surface and a bottom surface;

providing a veneer, the veneer possessing pores, cracks, and/or gaps;

applying a resin layer on the top surface of the basic carrier plate;

forming a multilayer body comprising the basic carrier plate, the veneer, the resin layer interposed between the basic carrier plate and the veneer, and a balancing layer arranged on the bottom surface of the basic carrier plate;

joining the basic carrier plate, the resin layer, the veneer, and the balancing layer by pressing the multilayer body in a press, wherein a pressing pressure, a pressing temperature and a pressing time are adjusted so that during the pressing of the multilayer body in the press, the pores, the cracks, and/or the gaps in the veneer are filled with resin from the resin layer separating the pressed multilayer body into individual panels; and profiling the panels at side borders of the panels and providing the panels with joining means, wherein the pressing of the multilayer body is carried out so that the resin permeates through the veneer so that after the pressing the resin is visible at a surface of the veneer, the resin layer is applied on the top surface of the basic carrier plate in liquid form, and the applying of the resin layer comprises partially drying the resin layer to adhere the resin layer to the basic carrier plate as a gel or wax layer.

22. A method for producing panels, said method comprising:

providing a basic carrier plate, the basic carrier plate comprising a top surface and a bottom surface;

providing a veneer, the veneer possessing pores, cracks, and/or gaps;

applying a resin layer on the top surface of the basic carrier plate;

forming a multilayer body comprising the basic carrier plate, the single veneer, the resin layer interposed between the basic carrier plate and the single veneer, and a balancing layer arranged on the bottom surface of the basic carrier plate;

joining the basic carrier plate, the resin layer, the veneer, and the balancing layer by pressing the multilayer body in a press, wherein a pressing pressure, a pressing temperature and a pressing time are adjusted so that during the pressing of the multilayer body in the press, the pores, the cracks, and/or the gaps in the veneer are filled with resin from the resin layer separating the pressed multilayer body into individual panels; and profiling the panels at side borders of the panels and providing the panels with joining means, wherein the pressing of the multilayer body is carried out so that the resin permeates through the veneer so that after the pressing the resin is visible at a surface of the veneer, the press comprises a press plate, and the press plate is heated to a temperature of between 180° C. and 210° C. during the pressing in the press.

23. The method of claim 22, wherein the resin layer is formed by a resin film.

24. The method of claim 22, wherein the resin layer is applied as a liquid, pasty film, and wherein color pigments and wood based fillers are added to the resin.

* * * * *